United States Patent
Watanabe (10) Patent No.: US 8,024,008 B2
(45) Date of Patent: Sep. 20, 2011

(54) BROADCASTING RECEIVER AND INFORMATION RECORDING MEDIUM

(75) Inventor: Akira Watanabe, Hanno (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 491 days.

(21) Appl. No.: 12/268,869

(22) Filed: Nov. 11, 2008

(65) Prior Publication Data

US 2009/0124295 A1    May 14, 2009

(30) Foreign Application Priority Data

Nov. 12, 2007 (JP) ................. 2007-292701

(51) Int. Cl.
*H04M 1/00* (2006.01)
(52) U.S. Cl. .............. 455/566; 455/414.1; 455/550.1; 455/575.1
(58) Field of Classification Search .......... 455/566, 455/414.1, 550.1, 575.1
See application file for complete search history.

(56) References Cited

U.S. PATENT DOCUMENTS 7,203,158 B2 * 4/2007 Oshima et al. ............. 370/208

| | | |
|---|---|---|
| 2006/0070098 A1 | 3/2006 | Watanabe |
| 2007/0223535 A1 | 9/2007 | Hamazaki |
| 2008/0075425 A1 | 3/2008 | Watanabe |

FOREIGN PATENT DOCUMENTS

| | | |
|---|---|---|
| JP | 2004-166173 | 6/2004 |
| JP | 2004-289712 | 10/2004 |
| JP | 2005-221954 | 8/2005 |
| JP | 2006-222790 | 8/2006 |
| JP | 2006-270231 | 10/2006 |
| JP | 2007-082087 | 3/2007 |
| JP | 2007-96508 | 4/2007 |
| JP | 2007-221695 | 8/2007 |
| JP | 2007-251480 | 9/2007 |

* cited by examiner

*Primary Examiner* — Nghi Ly
(74) *Attorney, Agent, or Firm* — Cozen O'Connor (57) ABSTRACT

When an instruction to change the display size of the content of a 1-segment broadcast received by a television broadcast communication unit is given while the content is being displayed on a display screen, and if it is possible to receive the content of a 12-segment broadcast continuously to the content of the 1-segment broadcast, a CPU switches to receiving the 12-segment broadcast and displays the broadcast content in the standard display size (second display size) of the 12-segment broadcast. If it is not possible to receive the 12-segment broadcast continuously to the 1-segment broadcast, the CPU displays the content of the 1-segment broadcast by changing it to the second display size.

10 Claims, 8 Drawing Sheets

1-SEG OR 12-SEG

VERTICAL STATE

FIG. 6A

1-SEG

VERTICAL STATE

FIG. 6C

12-SEG

HORIZONTAL STATE

FIG. 6B

1-SEG (ENLARGED)

HORIZONTAL STATE

BROADCASTING RECEIVER AND INFORMATION RECORDING MEDIUM

BACKGROUND OF THE INVENTION

1. Field of the Invention

The present invention relates to a broadcasting receiver that can receive and display broadcasting signals of different broadcast schemes, and an information recording medium.

2. Description of the Related Art

According to digital terrestrial television broadcasting, one channel assigned to each broadcasting station is generally divided into 13 segments. 12 segments of these divided bands are used for high-definition television broadcasting (high-resolution 12-segment broadcasting) having improved image and sound quality. The remaining 1 segment is used for mobile devices (simplified low-resolution 1-segment broadcasting). The following techniques are known as digital broadcasting receivers that receive and display both 1-segment broadcasts and 12-segment broadcasts.

Unexamined Japanese Patent Application KOKAI Publication No. 2004-289712 discloses a digital broadcasting receiver that controls itself to receive either a 1-segment broadcast or a 12-segment broadcast according to the display size.

Unexamined Japanese Patent Application KOKAI Publication No. 2007-96508 discloses a digital broadcasting receiver that, on the condition that a 12-segment broadcast and a 1-segment broadcast are simultaneously broadcast, displays a message that it is possible to switch from the 12-segment broadcast to the 1-segment broadcast if the reception quality (reception sensitivity) deteriorates while the 12-segment broadcast is received and displayed.

However, according to the digital broadcasting receiver disclosed in Unexamined Japanese Patent Application KOKAI Publication No. 2004-289712, a desired content is not necessarily broadcasted on the 1-segment broadcast or the 12-segment broadcast that is automatically selected according to the display size. For example, different programs might be broadcasted on the 1-segment broadcast and the 12-segment broadcast even on the same channel. An operation, made while viewing the 1-segment broadcast, to instruct a switch to the 12-segment broadcast for viewing in the larger size has to be followed by an operation to instruct a switch-back to the 1-segment broadcast if the desired program is not broadcasted on the 12-segment broadcast on the same channel. The digital broadcasting receiver disclosed in Unexamined Japanese Patent Application KOKAI Publication No. 2004-289712 thus has a problem that it requires troublesome operations for changing broadcasting schemes. Further, this digital broadcasting receiver might falsely recognize that the program on the 1-segment broadcast and that on the 12-segment broadcast are the same programs although these programs are different.

On the other hand, with the digital broadcasting receiver disclosed in Unexamined Japanese Patent Application KOKAI Publication No. 2007-96508, a user has to confirm by a message that simultaneous broadcasting is ongoing, before switching from the 12-segment broadcast to the 1-segment broadcast. Hence, this digital broadcasting receiver has a problem that the user has to make a bothersome operation when switching the broadcasting schemes.

SUMMARY OF THE INVENTION

The present invention was made in view of the above problems, and it is an object of the present invention to provide a broadcasting receiver that, with only an instruction to change a display state of a broadcast content that is being received and displayed, enables a user to continuously view the broadcast content in the changed new display state without a break in the content, and an information recording medium that stores a program for controlling a computer to realize the functions of the broadcasting receiver.

To achieve the above object, a broadcasting receiver according to a first aspect of the present invention is a broadcasting receiver that can receive and display a broadcasting signal of a first broadcasting scheme and a second broadcasting scheme, including: receiving unit that receives the broadcasting signal; broadcasting scheme switching unit that switches broadcasting schemes of the broadcasting signal received by the receiving unit; displaying unit that displays a broadcast content received by the receiving unit in a first display state in which the broadcast content is displayed in a first display size or at a first display magnification, or in a second display state in which the broadcast content is displayed in a second display size or at a second display magnification; display state change instructing unit that instructs to change the display state in which the displaying unit is displaying; determining unit that, when the display state change instructing unit instructs to change the display state while the displaying unit is displaying the broadcast content which the receiving unit receives in the first broadcasting scheme, determines whether it is possible or not to receive, continuously to the broadcast content in the first broadcasting scheme, the broadcast content in the second broadcasting scheme suitable for a new display state after the change; first control unit that, when the determining unit determines that continuous reception from the first broadcasting scheme to the second broadcasting scheme is possible, controls the broadcasting scheme switching unit to switch from the first broadcasting scheme to the second broadcasting scheme and the displaying unit to display the broadcast content in the new display state after the change; and second control unit that, when the determining unit determines that continuous reception from the first broadcasting scheme to the second broadcasting scheme is not possible, controls the display state change instructing unit to instruct to change the display state, so that the broadcast content which the receiving unit receives in the first broadcasting scheme is displayed on the displaying unit in the new display state after the change.

According to the present invention, it is possible to easily and appropriately switch broadcasting schemes.

BRIEF DESCRIPTION OF THE DRAWINGS

These objects and other objects and advantages of the present invention will become more apparent upon reading of the following detailed description and the accompanying drawings in which:

FIG. 4 is a flowchart showing a television broadcast receiving and outputting process performed when a television broadcast receiving function is turned ON;

FIG. 7 is a flowchart showing a television broadcast receiving and outputting process according to a second embodiment that is started when a television broadcast receiving function is turned ON.

DETAILED DESCRIPTION OF THE PREFERRED EMBODIMENTS

First Embodiment

The first embodiment of the present invention will now be explained with reference to FIG. 1 to FIG. 6.

Figures 1A, 1B, 1C, 1D:
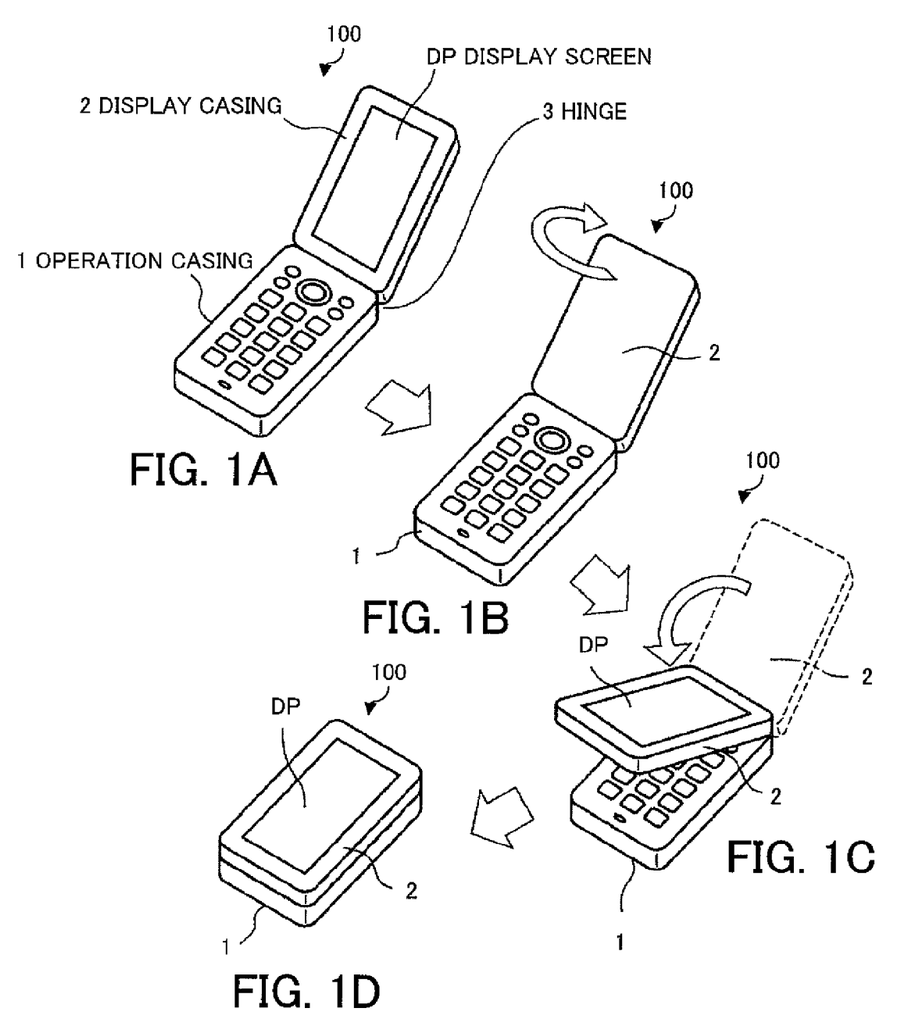
FIG. 1A is a diagram showing the appearance of an open style of a cellular phone used as a broadcasting receiver.
FIG. 1B is a diagram showing the appearance of a reversed open style of the cellular phone used as a broadcasting receiver.
FIG. 1C is a diagram showing a halfway folded state that appears when a display casing of the cellular phone used as a broadcasting receiver is folded as started from the reversed open style.
FIG. 1D is a diagram showing a view style of the cellular phone used as a broadcasting receiver.

The present embodiment will illustrate a case that the broadcasting receiver according to the present invention is realized as a cellular phone. FIG. 1 shows the appearance of a cellular phone 100 according to the present embodiment.

The cellular phone 100 has a two-axial hinge structure having an operation casing 1 and a display casing 2 constituting the phone body, and are joined together free to fold open/closed and free to rotate via a hinge 3. FIG. 1A shows the appearance of the cellular phone 100 when it is in an "open style", in which state the operation casing 1 and the display casing 2 are opened. The display casing 2 has a display screen DP which is a rectangular screen of, for example, 800×480 dots thus the display screen DP has the long sides and the short sides. When the cellular phone 100 is used in "open style", the posture of the display screen DP facing a user is vertically long. FIG. 1B shows the appearance of the cellular phone 100 when it is in a "reversed open style", which is a state obtained by rotating the display casing 2 by 180 degrees from the open style with a rotation axis that is perpendicular to the open/close axis running in the hinge 3. FIG. 1C shows a halfway state that appears while the display casing 2 is folded from the reversed open style. FIG. 1D shows the appearance of the cellular phone 100 when it is in a "view style", in which state the display casing 2 is completely closed as further folded from the state shown in FIG. 1C. When the cellular phone 100 is used in the "view style", the posture of the display screen DP facing a user is horizontally long.

Figure 2:
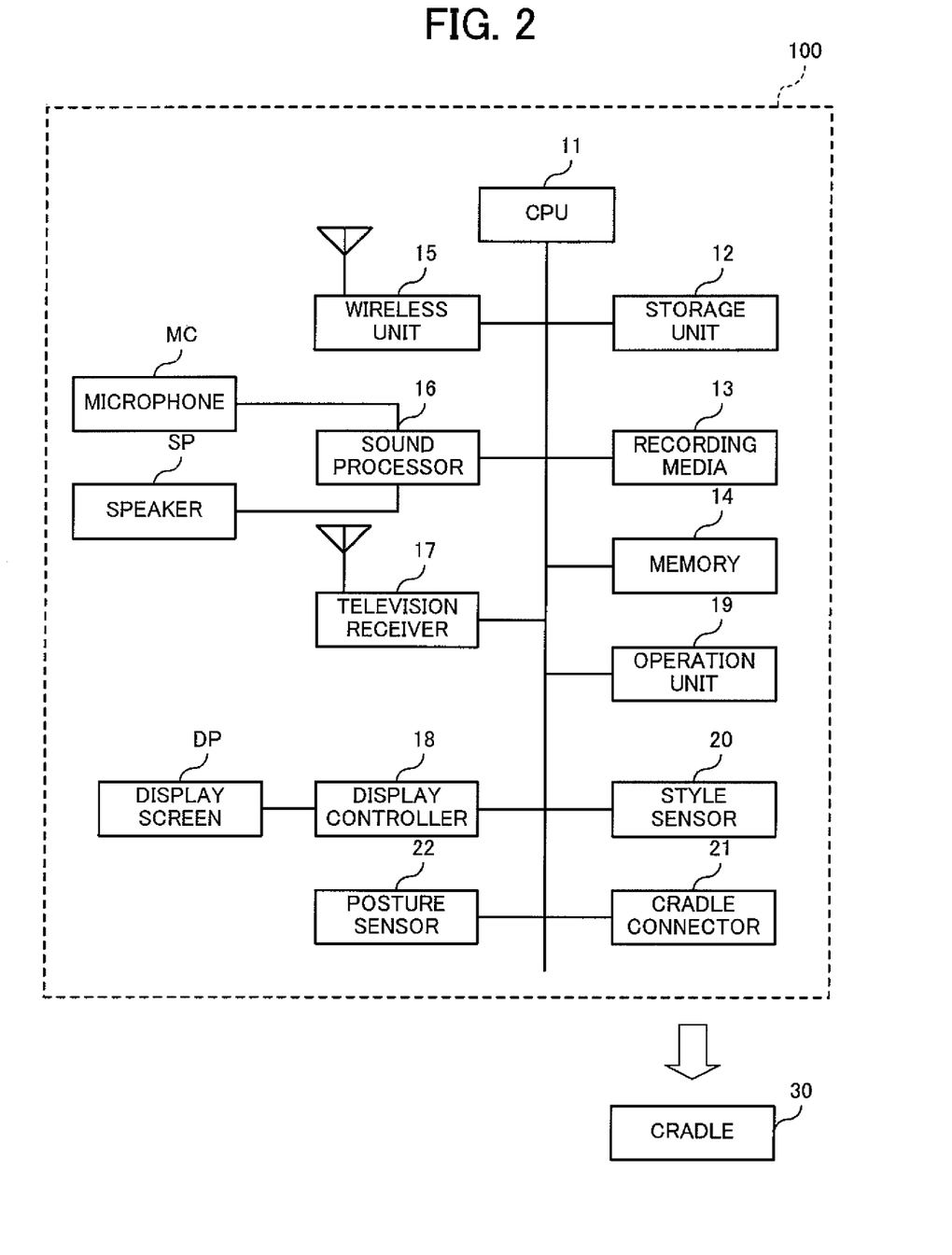
FIG. 2 is a block diagram showing basic components of the cellular phone according to an embodiment of the present invention.

FIG. 2 is a block diagram showing basic components of the cellular phone 100.

The cellular phone 100 according to the present embodiment has a phone call function, an e-mailing function, an Internet connecting function (web accessing function), a television broadcast receiving function, etc. To realize these functions, the cellular phone 100 comprises a CPU 11, a storage unit 12, recording media 13, a memory 14, a wireless unit 15, a sound processor 16, a television receiver 17, a display controller 18, an operation unit 19, a style sensor 20, a cradle connector 21, a posture sensor 22, and the like, as shown in FIG. 2.

The CPU (Central Processing Unit) 11 is an element that controls the entire cellular phone 100 according to various programs in the storage unit 12.

Figure 4:
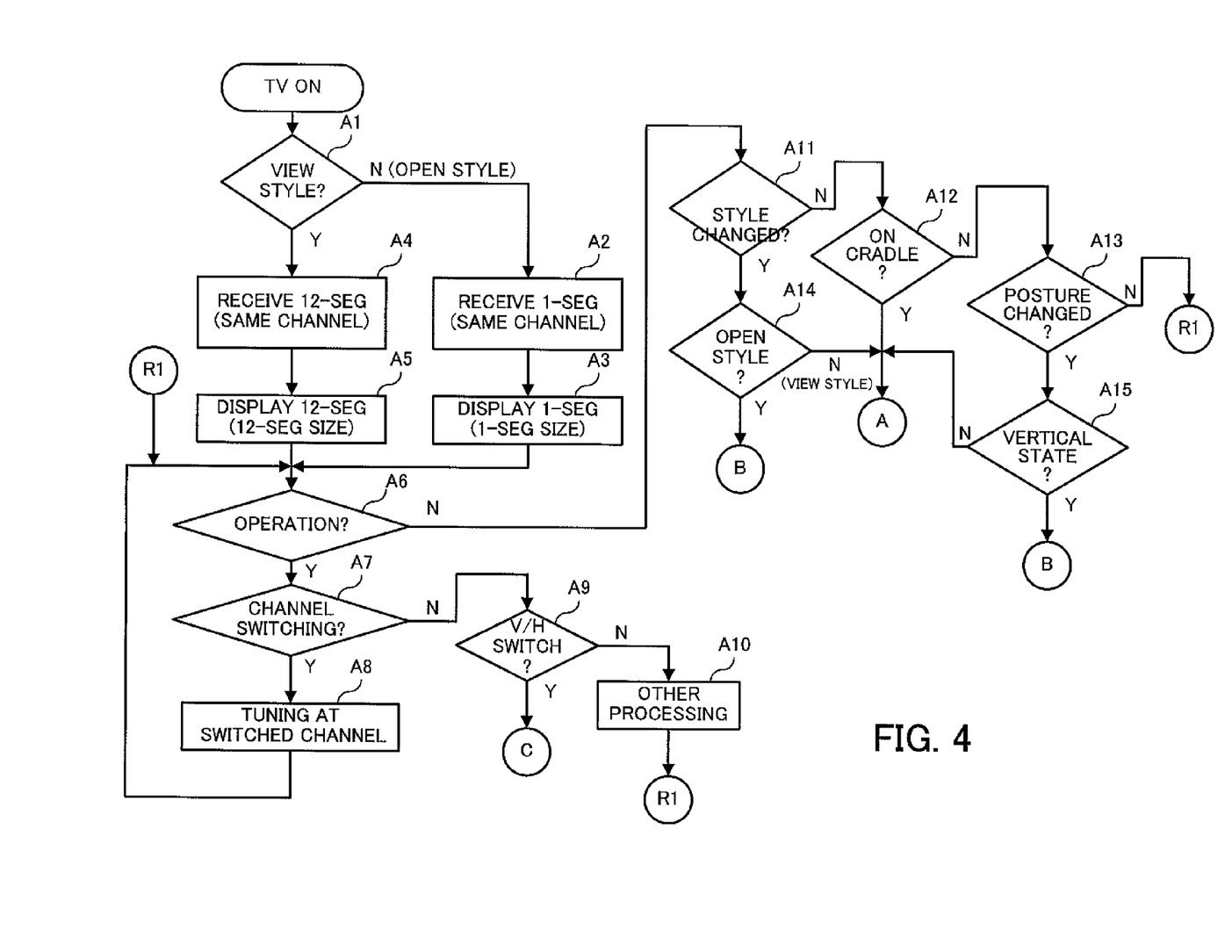
Figure 5:
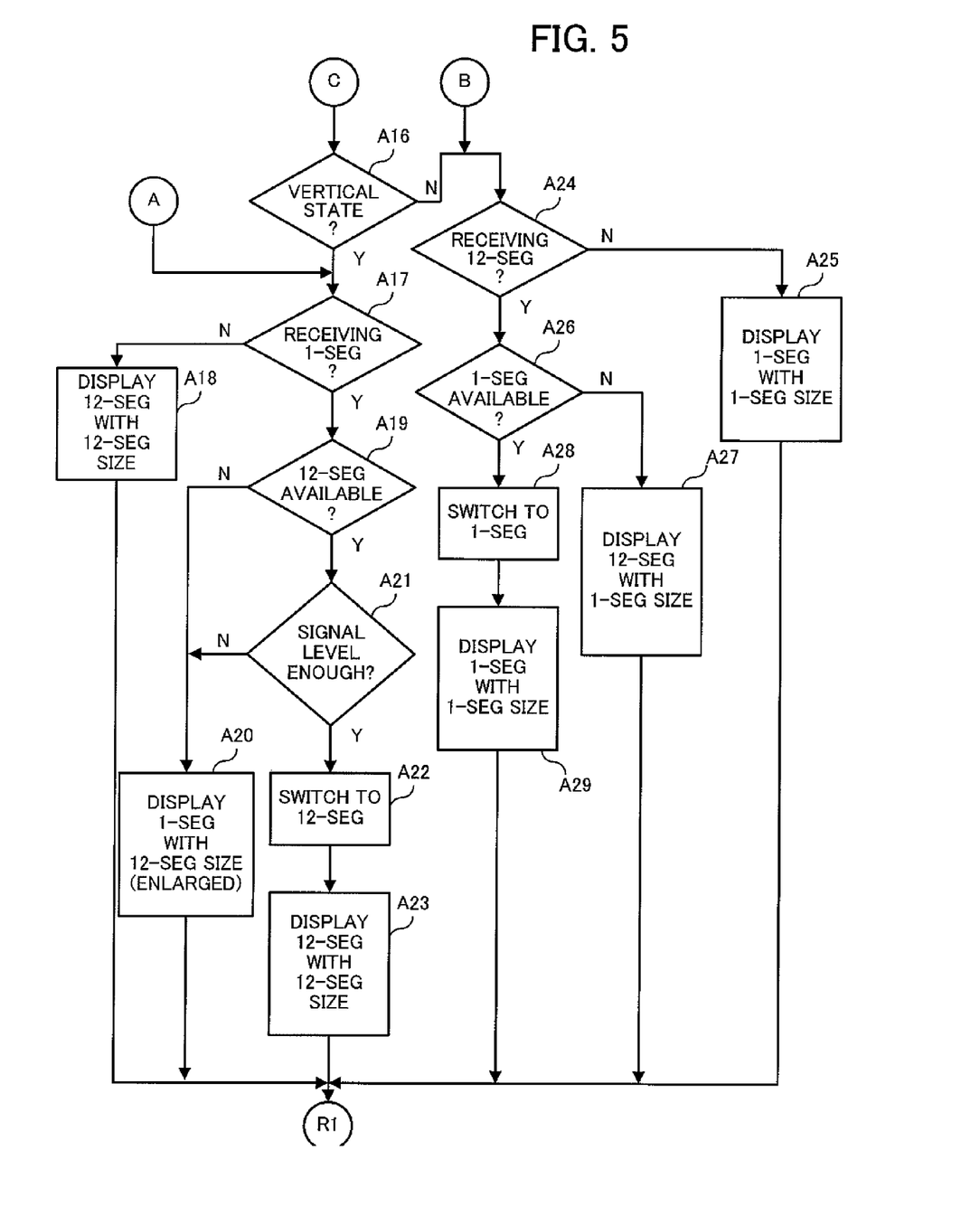
FIG. 5 is a flowchart to follow FIG. 4.

The storage unit 12 is an internal memory, and has a program area and a data area. A program for realizing the present embodiment according to the procedures to be described later shown in FIG. 4 and FIG. 5 is stored in the program area. The recording media 13 are detachable portable memories. The recording media 13 include, for example, an SD card (Secure Digital memory card), an IC card (Integrated Circuit card), etc.

The memory 14 is an internal memory having a work area. Data in the memory 14 are recorded onto the storage unit 12 as needed.

The wireless unit 15 may include RF (Radio Frequency) components, a baseband processing unit, a demultiplexer, and the like. The wireless unit 15 performs wireless communications with the nearest base station thus realizing phone calls, e-mail communications, Internet access, and the like. For example, when the cellular phone 100 is used for making phone calls, the wireless unit 15 acquires a signal from receiver function of the baseband processing unit to demodulate the signal into a baseband signal representing received voices, and inputs the baseband signals to the sound processor 16 to output voices via the speaker SP. Further, the wireless unit 15 acquires sound data from the sound processor 16 representing voices input to the microphone MC, codes it into an outgoing baseband signal, and supplies it to transmitter function of the baseband unit to output the signal via the antenna.

The television receiver 17 receives a digital terrestrial television broadcast, and also receives program information such as electronic program guide (EPG) about TV programs to be broadcasted. According to the digital terrestrial television broadcasting standard, bandwidth for 1 channel is divided into 13 segments. 12 segments out of these divided bands are used for 12-segment broadcasting (hereinafter referred to as "12-Seg"), and the remaining 1 segment is used for 1-segment broadcasting (hereinafter referred to as "1-Seg"). The television receiver 17 can receive 1-Seg (first broadcasting scheme) or 12-Seg (second broadcasting scheme) by switching them. Generally, users may select 12-Seg for viewing a high-quality broadcast, and may select 1-Seg when 12-Seg is not available by bad radio wave conditions or the like because 1-Seg is less affected by radio wave conditions though the quality might be deteriorated. However, it is at users' discretion which broadcasting scheme to select.

The television receiver 17 has an analog circuit section and a digital circuit section. The analog circuit section is connected to a dedicated antenna for extracting a broadcasting signal. The digital circuit section demodulates the received broadcasting signal by OFDM (Orthogonal Frequency Division Multiplexing) method, and decodes and demultiplexes multiplexed broadcasting signals into video data, sound data, and text data for 12-Seg. Furthermore, the digital circuit section decodes a signal into videos, sounds, and data (text data) for 1-Seg, controls switching between 12-Seg and 1-Seg, and decompresses compressed data.

The display controller 18 controls, in accordance with an instruction from the CPU 11, a display screen (rectangular screen) DP to which a high-definition liquid crystal, organic electro-luminescence (OEL), or the like is applied. When displaying TV programs on the display screen DP, the display controller 18 performs display control in accordance with the posture of the display screen DP. That is, the display controller 18 performs display control according to whether the long side of the display screen DP is set in the left and right direction (horizontal direction) (hereinafter, this state will be referred to as "horizontal state") or set in the up and down direction (vertical direction) (hereinafter, this state will be referred to as "vertical state"). In the horizontal state, the display controller 18 displays images with full-screen size of the display screen DP (that is, landscape format whose horizontal length is longer than vertical length). In the vertical state, the display controller 18 also displays images by the landscape format but with predetermined size so as to fit the vertically postured display screen DP. That is, since video images are fixed to the landscape format, television images are always displayed by the landscape format though the posture of the display screen DP is horizontal or vertical.

Figure 3A:
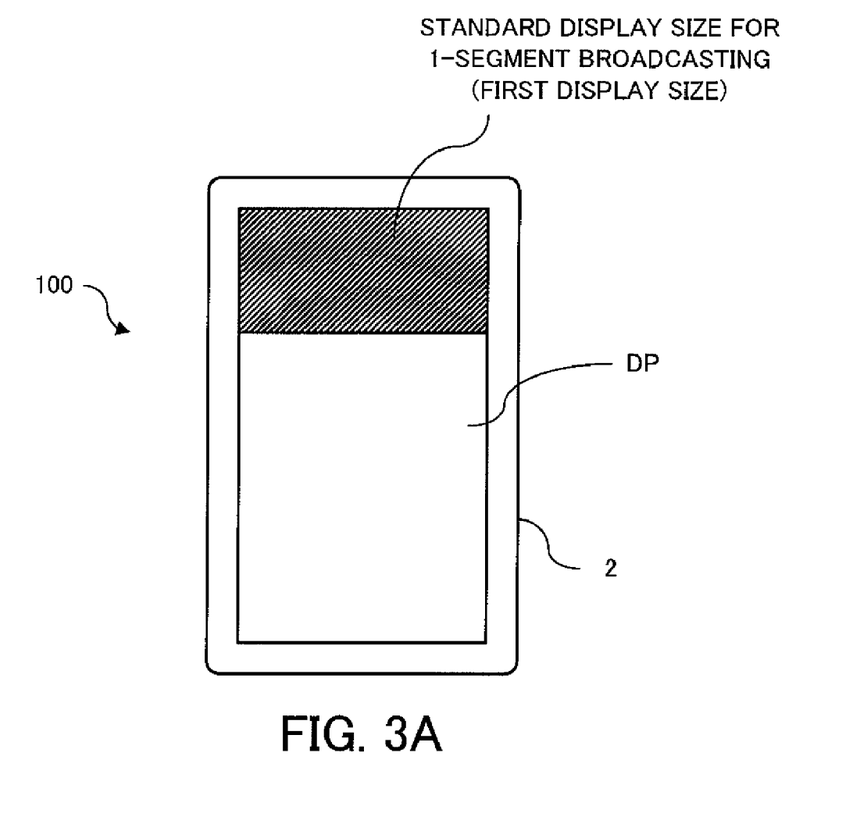
FIG. 3A is a diagram showing a horizontally-long display in a vertical state, when a television is displayed horizontally long in a predetermined size with a display screen DP set in a vertical state.
Figure 3B:
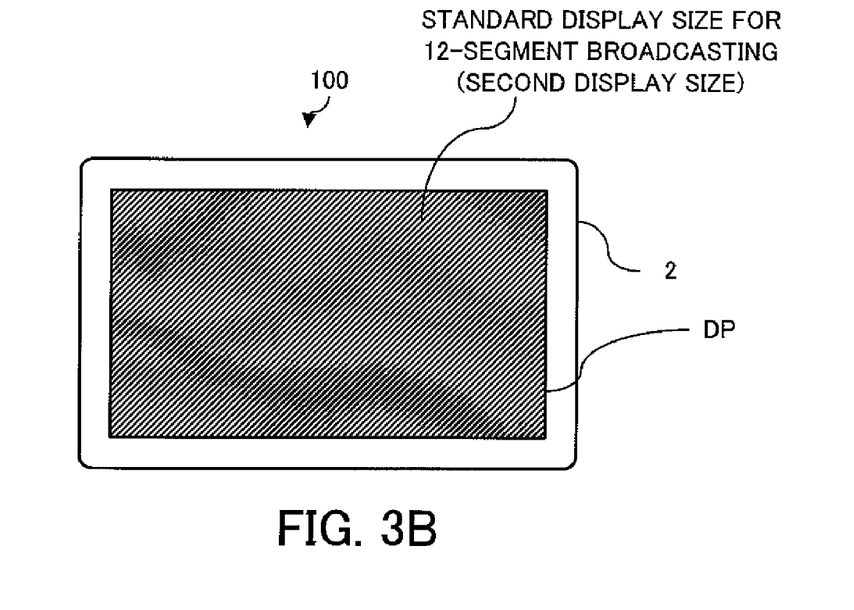
FIG. 3B is a diagram showing a horizontally-long display in a horizontal state, when a television is displayed horizontally long in a full-screen size with the display screen DP set in a horizontal state.

FIG. 3A shows an example of television display in the vertical state, where television images are displayed by the landscape format with a predetermined size in the vertically postured display screen DP. FIG. 3B shows an example of television display in the horizontal state where television images are displayed by the landscape format with the full-screen size. In FIGS. 3A and 3B, hatched areas represent the areas on the display screen DP in which the television images are displayed. The hatched area of FIG. 3A represents the above-mentioned predetermined size. The predetermined size represents the standard display size for 1-Seg (first display size: hereinafter, referred to as "1-Seg size"). As shown in FIG. 3A, the predetermined size (1-Seg size) is the size of a rectangle that coincides with the upper area of the display screen DP in the vertical state. The long side of this rectangle coincides with the short side of the display screen DP. The hatched area of FIG. 3B represents the above-mentioned full-screen size. The fall-screen size is the standard display size for 12-Seg (second screen size: hereinafter referred to as "12-Seg size"). This standard display size (12-Seg size) is the size of a rectangle that coincides with the whole display area of the display screen DP in the horizontal state.

The operation unit 19 is used for dialing, character input, command input, etc. The operation unit 19 has a "television ON/OFF key" for turning ON/OFF the television broadcast receiving function, a "vertical/horizontal switching key" for switching the display state of a television according to the posture of the display screen DP, a "display zooming key" for scaling up/down the displayed content, etc. The CPU 11 performs a process according to an input signal supplied by the operation unit 19.

The style sensor 20 detects each of the styles that change from one to another according to the disposition of the two casings (operation casing 1 and display casing 2) that constitute the phone body. The style sensor 20 may include, for example, a magnetic sensor, a micro switch, and the like. The CPU 11 discriminates the respective styles (open style, reversed open style, view style, etc.) of the phone body based on a detection signal supplied by the style sensor 20.

The cradle connector 21 is a connector for connecting the cellular phone 100 to a cradle 30 (battery charge stand) for charging a secondary cell (unillustrated) by accepting electric current supplied via the cradle 30, when the cellular phone 100 is placed on the cradle 30. The CPU 11 determines whether the cellular phone 100 is electrically connected to the cradle 30 by placing the phone body on the cradle 30, based on a detection signal supplied by the cradle connector 21. When the cellular phone 100 is placed on the cradle 30, the display screen DP lies in the horizontal state. The cradle 30 has not only the battery charging function, but a function as a stand for the cellular phone 100 for viewing a television broadcast.

The posture sensor 22 detects the posture of the display screen DP. The posture sensor 22 is constituted by, for example, an accelerometer. The posture sensor 22 detects whether the display screen DP is in the vertical state or the horizontal state, and supplies a detection signal to the CPU 11.

The operation of the cellular phone 100 according to the first embodiment will now be explained with reference to the flowcharts shown in FIG. 4 and FIG. 5. Each function described in these flowcharts is realized by executing stored program codes. And operations according to the program codes are performed as needed. The program codes may be obtained through telecommunication means. These options are also applicable to other embodiments. That is, the operation of the present embodiment can be performed with the use of not only a program/data in the storage medium, but also those externally supplied through telecommunication means or the like.

FIG. 4 and FIG. 5 show flowcharts that illustrate characteristic operations of the present embodiment realized by the cellular phone 100. Hence, the CPU 11 returns to the flow of the entire operation (unillustrated) when getting out of the flow of FIG. 4 and FIG. 5.

FIG. 4 and FIG. 5 are flowcharts showing a television broadcast receiving and outputting process that is activated when the television broadcast receiving function is turned ON.

The CPU 11 turns ON the television broadcast receiving function and starts the process of the flowchart shown in FIG. 4, when the television ON/OFF key is operated after the power button (unillustrated) of the operation unit 19 is depressed.

Figure 6A:
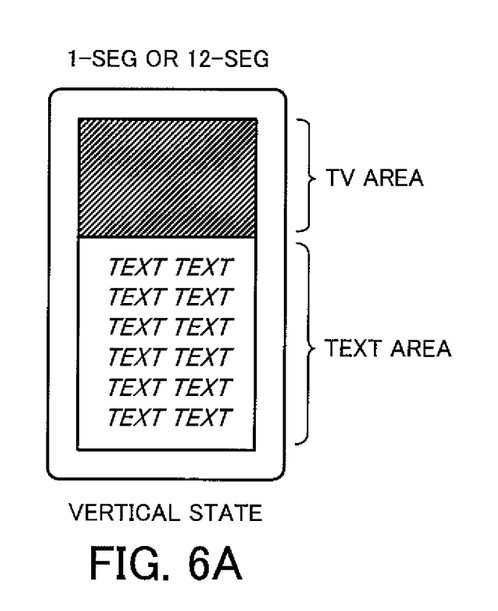
FIG. 6A is a diagram showing first display size (standard display size for 1-segment broadcasting) when receiving 1-segment broadcasting or 12-segment broadcasting, whose long sides fit the short sides of the display screen when the display casing is in a vertical state.

First, the CPU 11 acquires a detection signal supplied by the style sensor 20, and determines whether the current style is the view style or not (step A1). When it is determined that the current style is the open style (step A1; No), the CPU 11 controls the television receiver 17 to tune to the channel that was previously viewed and starts receiving the 1-segment broadcast of that channel (step A2). At this time, the display screen DP is in the vertical state because it is in the open style. Hence, the CPU 11 recognizes that the display screen DP is in the vertical state, and displays the 1-Seg television images with the 1-Seg size in the vertical state (step A3). FIG. 6A shows an example of display when the 1-Seg images are displayed in its standard display size (first display size (1-Seg size)) in the vertical state. As shown in FIG. 6A, received images are displayed in the 1-Seg size at the upper area of the vertically postured display screen DP, and text data about the program being received is displayed in the middle and lower areas of the display screen DP.

Figure 6B:
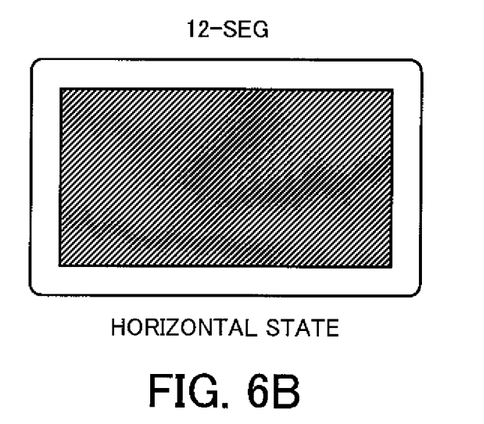
FIG. 6B is a diagram showing second display size (standard display size for 12-segment broad casting) when receiving 12-segment broadcasting, whose long sides fit the long sides of the display screen when the display casing is in a horizontal state.

On the other hand, if it is determined that the current style is the view style (step A1; Yes), the CPU 11 tunes to the channel previously viewed, and starts receiving the 12-segment broadcast of this channel (step A4). In this view style, the display screen DP is in the horizontal state. Hence, the CPU 11 recognizes that the display screen DP is in the horizontal state, and displays 12-Seg television images with the 12-Seg size on the display screen DP in the horizontal state (step A5). FIG. 6B shows an example of 12-Seg size display where the 12-Seg television images are displayed in its standard display size (second display size (12-Seg size)) on the display screen DP in the horizontal state. That is, received images are displayed by the landscape format which covers the entire display area of the display screen DP.

Next, when an operation is made while performing 1-Seg size display in the vertical state or while performing 12-Seg size display in the horizontal state (step A6; Yes), the CPU 11 determines whether this operation is a channel switching operation or not (step A7). When determined that it is a channel switching operation (step A7; Yes), the CPU 11 instructs the television receiver 17 to switch channels, and starts receiving a new channel (step A8). After this, the CPU 11 returns the flow to step A6, and continues to determine whether a new operation is made or not.

On the other hand, when an operation other than channel switching is made (step A7; No), the CPU 11 determines whether the vertical/horizontal switching key is operated to switch the posture of the display screen DP (step A9). When it is determined that an operation (e.g., sound volume control) other than vertical/horizontal switching is instructed (step A9; No), the CPU 11 performs a process according to the instruction (step A10). On the other hand, when it is determined that the vertical/horizontal switching key is operated (step A9; Yes), the CPU 11 executes operation shown in FIG. 5. The CPU 11 accesses the posture sensor 22 to determine whether the current posture of the display screen DP is the vertical state or not (step A16). If the vertical/horizontal switching key is operated while the display screen DP is in the vertical state (step A16; Yes), the CPU 11 performs a display control process for switching from the vertical state to the horizontal state (steps A17 to A23).

First, the CPU 11 determines whether the cellular phone 100 is now receiving a 1-segment broadcast or not (step A17). If it is determined that receiving television broadcasting is 12-segment broadcast (step A17; No), i.e., when the vertical/horizontal switching key is operated while the 12-Seg images are being displayed on the display screen DP in the vertical state, the CPU 11 controls the display controller 18 to change the display size to 12-Seg size which is the standard display size for 12-Seg (second display size) so that received 12-Seg images will be displayed with 12-Seg size on the display screen DP in the horizontal state (step A81). If it is determined that receiving television broadcasting is 1-segment broadcasting (step A17; Yes), the CPU 11 determines whether it is possible or not to continuously receive the same program by 12-Seg. More precisely, the CPU 11 determines whether the simultaneous broadcasting with 1-Seg and 12-Seg is now being available or not, based on program guides for present 1-Seg and 12-Seg (step A19).

Figure 6C:
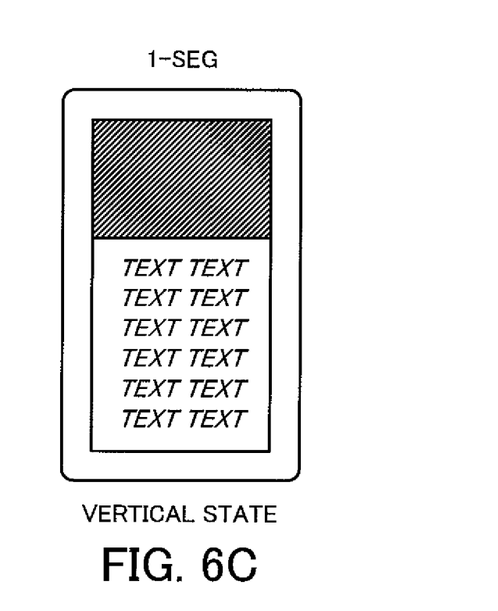
FIG. 6C is a diagram showing the first display size (standard display size for 1-segment broadcasting) when receiving 1-segment broadcasting, whose long sides fit the short sides of the display screen when the display casing is in a vertical state.
Figure 6D:
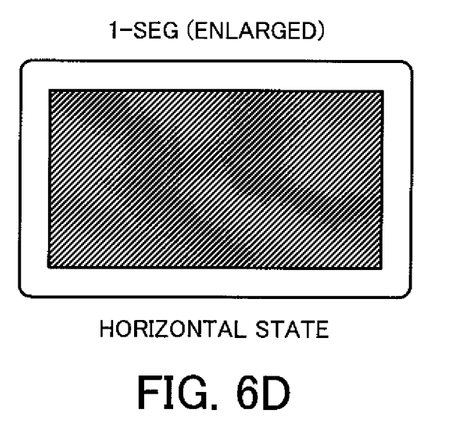
FIG. 6D is a diagram showing an enlarged display for 1-segment broadcasting where received frames are enlarged to fit the second display size (standard display size for 12-segment broadcasting)

If it is determined that the simultaneous broadcasting is not available (step A19; No), the CPU 11 controls the display controller 18 to enlarge the display size (image size) of the 1-Seg images to 12-Seg size that is the standard display size for the 12-segment broadcast (second display size), thus the enlarged images are displayed on the display screen DP in the horizontal state (step A20). That is, 1-Seg size display in the vertical state as shown in FIG. 6C are enlarged to 12-Seg size as shown in FIG. 6D.

On the other hand, if it is determined that simultaneous broadcasting is being available (step A19; Yes), the CPU 11 determines whether it is possible or not to receive the 12-segment broadcast, based on the signal level of the 12-segment broadcast corresponding to the channel by which the TV program that has been received by 1-Seg is on (step A21). That is, the CPU 11 determines whether the signal level of the 12-segment broadcast to be received is enough or not based on the intensity of the electric field of the received broadcasting signal.

In a case where the detected signal level for 12-Seg is poor (step A21; No), the CPU 11 controls the display controller 18 to enlarge the images displayed in 1-Seg size to 12-Seg size that is the standard display size for the 12-segment broadcast (second display size) likewise the above case, and performs the enlarged display on the display screen DP in the horizontal state (step A20).

On the other hand, if it is determined that the signal level of the 12-segment broadcast is enough (step A21; Yes), the CPU 11 determines that it is possible to continuously receive the same program by 12-Seg. In this case, the CPU 11 controls the television receiver 17 to switch reception mode from 1-Seg to 12-Seg (step A22), thus images received by 12-Seg are displayed in 12-Seg size that is the standard display size for 12-Seg (second display size) on the display screen DP in the horizontal state (step A23). That is, when 12-Seg is available for continuously viewing the same program, television reception is switched to 12-Seg from 1-Seg, and the display size is changed to 12-Seg size as shown in FIG. 6B from 1-Seg size as shown in FIG. 6A.

On the other hand, when determined that the horizontal/vertical switching key is operated while the display screen DP is in the horizontal state (step A16; No), the CPU 11 performs a display control process for switching the display from the horizontal state to the vertical state (steps A24-A29).

In this case, the CPU 11 determines whether the cellular phone 100 is now receiving 12-Seg (that is, displaying images received by 12-Seg) (step A24). If it is determined that a 1-segment broadcast is being received when the vertical/horizontal switching key is operated (step A24; No), the CPU 11 controls the display controller 18 to display 1-Seg images in 1-Seg size that is the standard display size for 1-Seg (first display size) on the display screen DP in the vertical state (step A25).

On the contrary, if it is determined that a 12-segment broadcast is being received (step A24; Yes), the CPU 11 determines whether it is possible or not to continuously receive a 1-segment broadcast by 12-seg. That is, the CPU 11 determines whether the simultaneous broadcasting with 12-Seg and 1-Seg is being available or not (step A26).

If it is determined that the simultaneous broadcasting is not available (step A26; No), the CPU 11 controls the display controller 18 to display images received by 12-Seg in 1-Seg size that is the standard display size for 1-Seg (first display size) on the display screen DP in the vertical state (step A27).

On the other hand, if it is determined that the simultaneous broadcasting is available (step A26; Yes), the CPU 11 determines that it is possible to continuously receive the same program by 1-Seg, and controls the television receiver 17 to switch the television reception mode from 12-Seg to 1-Seg (step A28). In this case, received 1-Seg images are displayed in 1-Seg size that is the standard display size for 1-Seg (first display size) on the display screen DP in the vertical state (step A29).

Returning to the flowchart shown in FIG. 4, if there is no key operation (step A6; No), the CPU 11 determines whether the change in size has been instructed along the switching of the style (step A11 to A15).

If it is determined that the style is changed to the open style from the view style (step A11; Yes, step A14; Yes), the CPU 11 executes the above-described steps A24 to A29 of FIG. 5 to perform the display control process for switching the display from the horizontal state to the vertical state.

On the other hand, if the style change is from the open style to the view style (step A14; No), the CPU 11 executes the above-described steps A17 to A23 of FIG. 5 to perform the display control process for switching the display from the vertical state to the horizontal state.

Further, the CPU 11 determines whether the cellular phone 100 is set (placed) on the cradle 30 or not, based on a detection signal from the cradle connector 21 (step A12). If it is determined that the cellular phone 100 is set on the cradle 30 (step A12; Yes), the CPU 11 performs the display control process for switching the display from the vertical state to the horizontal state (steps A17 to A23 of FIG. 5). Furthermore, the CPU 11 determines whether the posture of the display screen DP has been changed or not, based on a detection signal from the posture sensor 22 (step A13). If it is determined that the posture of the display screen DP has been changed (step A13; Yes), the CPU 11 determines whether the display screen DP is in the vertical state or not (step A15).

If the posture of the display screen DP is in the vertical state (step A15; Yes), the CPU 11 performs the display control process for switching the display from the horizontal state to the vertical state (steps A24 to A29 of FIG. 5).

On the other hand, if the posture of the display screen DP is in the horizontal state (step A15; No), the CPU 11 performs the display control process for switching the display from the vertical state to the horizontal state (steps A17 to A23 of FIG. 5).

As described above, when an instruction to change the display size is given while a TV program received by 1-Seg via television receiver 17 is displayed on the display screen DP, the CPU 11 first determines whether it is possible or not to continuously receive the same program by 12-Seg. If it is possible to continuously receive the same program by 12-Seg, the TV reception mode is switched to 12-Seg, and displays the received images in the 12-Seg size that is the standard display size for 12-Seg (second display size). On the other hand, if it is not possible to continuously receive the same program by 12-Seg, the TV reception mode for 1-Seg is kept but display size is changed to 12-Seg size that is the standard display size for 12-Seg (second display size). This process requires the user to only give an instruction to change the display size while a received broadcast content is being displayed, in order that the user can view the broadcast content in the changed new display size without being interrupted viewing the content. Hence, duties of the user can be greatly reduced.

Accordingly, in a case where 1-Seg and 12-Seg are available, display size is controllable by just switching the TV reception mode when an instruction for changing the display size from 1-Seg size (first display size) to 12-Seg size (second display size) is given.

In this switching process, the instruction for changing the display size is not only given by the key operation on the vertical/horizontal switching key. That is, the display size changing instruction is given when the posture of the display screen DP is changed in accordance with change of the style of the apparatus body, or the posture of the display screen DP is changed by setting the apparatus body on the cradle 30, or the posture of the display screen DP is changed in response to changes of the posture of the apparatus body. Hence, it is possible to activate the display control for changing the size of the display area according to the posture of the display screen DP, not only when the vertical/horizontal switching key is operated, but also when the style of the apparatus body is changed, when the apparatus body is set on the cradle 30, and when the posture of the apparatus body is changed.

When an instruction to change the display size is given, it is determined whether the broadcast currently received is a 1-segment broadcast or a 12-segment broadcast, before it is determined whether it is possible or not to continuously receive the same program after the TV reception mode is switched. If the currently receiving broadcasting is 1-segment broadcast, the mentioned determination whether continuous reception is possible or not is carried out. If the currently receiving broadcasting is 12-segment broadcast, the content received by the 12-segment broadcast is displayed in the second display size. Therefore, when a size change is to be made while a 12-segment broadcast is being received, it can be made without the determination whether continuous reception is possible or not.

Further, it is determined whether continuous reception is possible or not, based on whether simultaneous broadcasting is available or not, which is determined by comparing program information of a 1-segment broadcast and program information of a 12-segment broadcast. This enables smooth continuous viewing.

Further, it is determined whether continuous reception is possible or not, based on the reception quality when the 12-segment broadcast is received on the channel on which the 1-segment broadcast is received. This enables smooth continuous viewing.

In the first embodiment described above, the first broadcasting scheme is the 1-segment broadcasting (1-Seg), and the second broadcasting scheme is the 12-segment broadcasting (12-Seg). However, the configuration is not limited to this, and the first broadcasting scheme may be the 12-segment broadcasting and the second broadcasting scheme may be the 1-segment broadcasting. In this case, the first display size may represent the standard display size for the 12-segment broadcasting, and the second display size may represent the standard display size for the 1-segment broadcasting.

Second Embodiment

The second embodiment of the present invention will now be explained with reference to FIG. 7 and FIG. 8.

In the first embodiment, when an instruction to change the display size is given while a broadcast content is being displayed, the broadcast content is displayed in the instructed size.

In the present embodiment, when an instruction to change the magnification at which a broadcast content is displayed is instructed while the broadcast content is being displayed, the content will be displayed at the new magnification.

The process for displaying a broadcast content at an instructed magnification will be explained with reference to the flowcharts of FIG. 7 and FIG. 8.

In this embodiment, the components that are the same basically or in terms of the names of the components in the first embodiment will be indicated by the same reference numerals, and will not be explained repeatedly. Hereinafter, only the characteristic structures and processing of the second embodiment will be explained.

Figure 7:
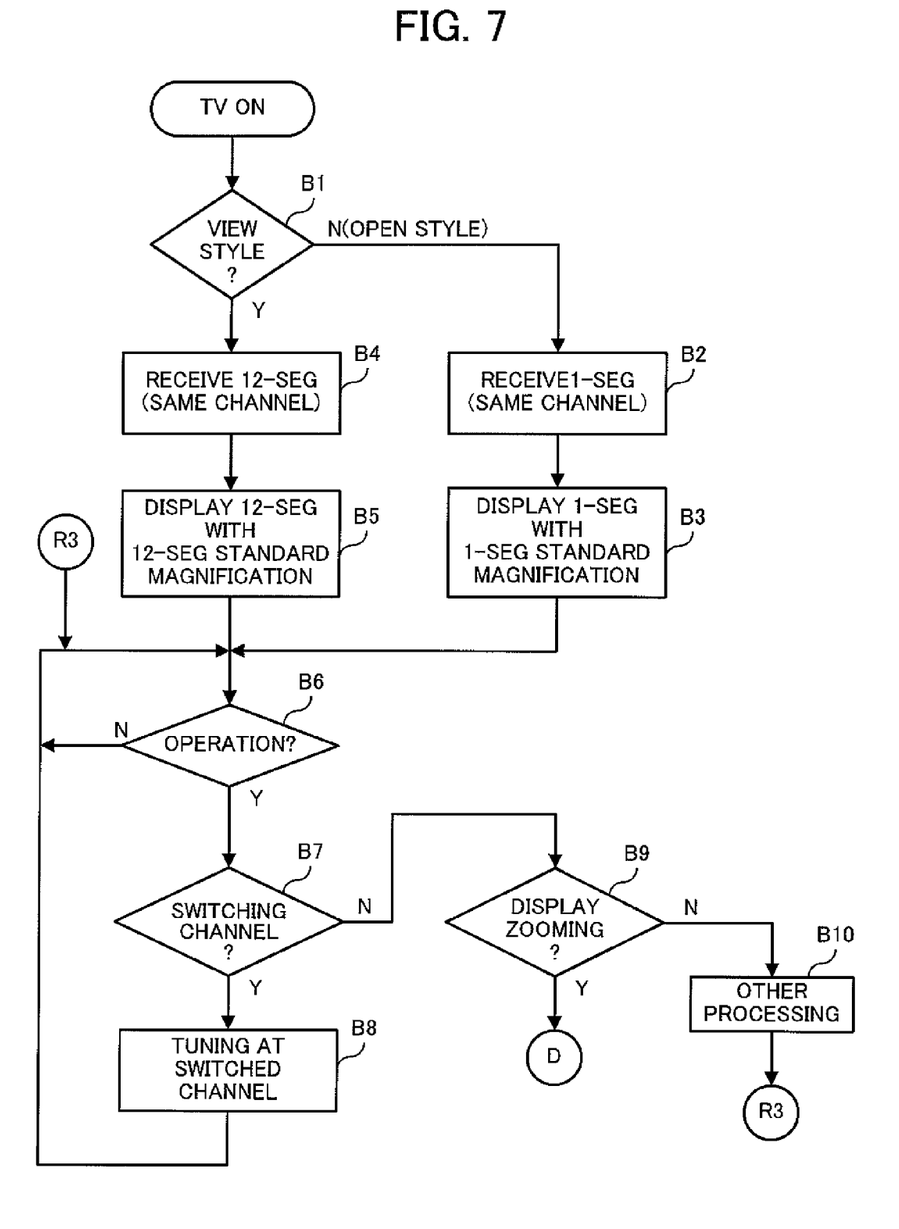
Figure 8:
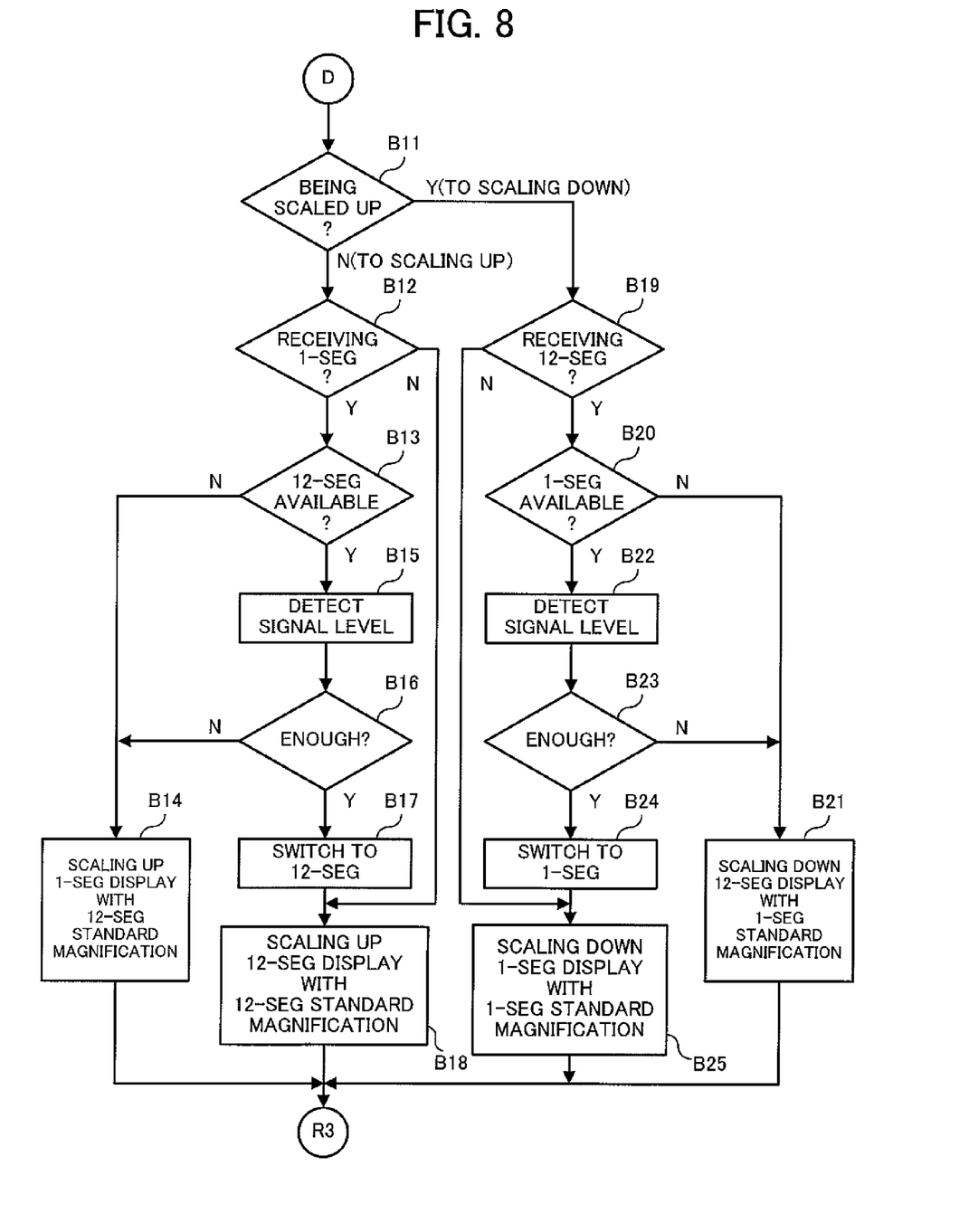
FIG. 8 is a flowchart following FIG. 7.

FIG. 7 and FIG. 8 illustrate flowcharts that show a television broadcast receiving and outputting process that is started when the television broadcast receiving function is turned ON.

When the television broadcast receiving function is turned ON with an operation of the television ON/OFF key, the CPU 11 starts the television broadcast receiving and outputting process.

First, the CPU 11 determines whether the current style is the view style or not, based on a detection signal supplied by the style sensor 20 (step B1).

If it is determined that the current style is the open style (step B1; No), the CPU 11 controls the television receiver 17 to tune to the channel previously viewed, and starts receiving the 1-segment broadcast at that channel (step B2).

In this case, the CPU 11 recognizes that the display screen DP is in the vertical state because it is in the open style, and displays images received by 1-Seg on the display screen DP in the vertical state. At this time, the CPU 11 controls the display controller 18 to display the received 1-Seg images at standard display magnification for 1-Seg (first display magnification) (step B3). The first display magnification is the standard display magnification for the 1-segment broadcast, which is predetermined such that the content of the 1-segment broadcast is displayed in the size of a rectangle that coincides with the upper area of the display screen DP in the vertical state as shown in FIG. 3A.

On the other hand, if it is determined that the current style is the view style (step B1; Yes), the CPU 11 tunes to the channel previously viewed, and starts receiving the 12-segment broadcast at that channel (step B4).

In this case, the CPU 11 recognizes that the display screen DP is in the horizontal state because it is in the view style, and displays images received by 12-Seg on the display screen DP in the horizontal state. At this time, the CPU 11 displays the received 12-Seg images at the standard display magnification for 12-Seg (second display magnification) (step B5). The second display magnification is the standard display magnification for the 12-segment broadcast that is predetermined such that the content of the 12-segment broadcast is displayed in the entire display area of the display screen DP in the horizontal state as shown in FIG. 3B.

The CPU 11 determines whether or not any operation is made while the 1-segment broadcast or the 12-segment broadcast is being received, based on operation information supplied by the operation unit 19 (step B6).

If it is determined that an operation is made (step B6; Yes), the CPU 11 determines whether the operation is a channel switching operation or not (step B7).

If it is determined that it is a channel switching operation (step B7; Yes), the CPU 11 instructs the television receiver 17 to switch channels, and starts receiving the broadcast of the new channel after the channel switching (step B8). Then, the process flow goes back to step B6 thus the CPU 11 continues detection whether or not any operation is made.

On the other hand, if it is determined that any other operation than channel switching is made (step B7; No), the CPU 11 determines whether the display zooming key for scaling up or down the display content is operated or not (step 139). If it is determined that any other operation is made (step 139; No), the CPU 11 performs a process according to the instructed operation, e.g., sound volume control (step B10).

When determined that the display zooming key is operated (step B9; Yes), the CPU 11 executes processing of the flowchart shown in FIG. 8, and performs a display scaling up process or a display scaling down process in accordance with the operation to the display zooming key.

First, the CPU 11 determines whether the current display state is a scaled-up zoomed display or not (step B11).

If it is determined that the current display state is not a scaled-up zoomed display (step B11; No), the CPU 11 performs the display scaling up process (steps B12 to B18).

On the other hand, if it is determined that the current display state is a scaled-up zoomed display (step B11; Yes), the CPU 11 performs the display scaling down process (steps B19 to B25).

Upon starting the display scaling up process, the CPU 11 determines whether or not a 1-segment broadcast is now being received (step B12).

If the currently receiving broadcast is 12-segment broadcasting (step B12; No), the CPU 11 displays the content of the 12-segment broadcast to be scaled up to its standard display magnification (second display magnification) (step B18).

On the other hand, if it is determined that a 1-segment broadcast is being received (step B12; Yes), the CPU 11 determines whether the simultaneous broadcasting with 1-Seg and 12-Seg is available or not in order to determine whether it is possible or not to continuously receive the same program by 12-Seg (step B13).

If it is determined that the simultaneous broadcasting is not available (step B13; No), the CPU 11 displays the content of the 1-segment broadcast to be scaled up to the standard display magnification (second display magnification) of the 12-segment broadcast (step B14).

On the other hand, if the simultaneous broadcasting is available (step B13; Yes), the CPU 11 performs signal level detection for 12-Seg at the same channel which has been tuned for 1-Seg is enough (step B15), and determines whether the signal level is enough or not (step B16).

If the signal level at which the 12-segment broadcast is received is poor (step B16; No), the CPU 11 displays the content of the 1-segment broadcast to be scaled up to the standard display magnification for 12-Seg (second display magnification) (step B14).

On the other hand, if the signal level at which the 12-segment broadcast is received is enough (step B16; Yes), the CPU 11 switches the TV reception mode from 1-Seg to 12-Seg (step B17). Then, the CPU 11 controls the display controller 18 to display the images received by 12-Seg to be scaled up and zoomed to its standard display magnification (second display magnification) (step B18).

On the other hand, when the display scaling down process is started (step 1311; Yes), the CPU 11 determines whether or not a 12-segment broadcast is being received (step B19).

In a case where a 1-segment broadcast is being received when the display zooming key is operated (step B19; No), the CPU 11 displays the images received by 1-Seg to be scaled down to its standard display magnification (first display magnification) (step B25).

On the other hand, in a case where a 12-segment broadcast is being received (step B19; Yes), the CPU 11 determines whether the simultaneous broadcasting with 12-Seg and 1-Seg is available to determine whether it is possible or not to continuously receive the same program by 1-Seg (step B20).

If the simultaneous broadcasting is not available (step B20; No), the CPU 11 controls the display controller 18 to display the images received by 12-Seg to be scaled down to the standard display magnification for 1-Seg (first display magnification) (step B21).

On the other hand, if the simultaneous broadcasting is available (step B20; Yes), the CPU 11 detects signal level of the 1-segment broadcast on the channel same as that which has been tuned while receiving 12-Seg (step P22), and determines whether the signal level is enough or not (step B23).

If the signal level at which the 1-segment broadcast is received is poor (step B23; No), the CPU 11 controls the display controller 18 to display the images received by 12-Seg to be scaled down to the standard display magnification for 1-Seg (first display magnification) (step B21).

On the other hand, if the signal level at which the 1-segment broadcast is received is enough (step B23;Yes), the CPU 11 controls the television receiver 17 to switch the TV reception mode from 12-Seg to 1-Seg (step P24). Then, the CPU 11 controls the display controller 18 to display the images received by 1-Seg to be scaled down to its standard display magnification (first display magnification) (step B25).

As described above, when the CPU 11 is instructed to change the display magnification while displaying the content of a 1-segment broadcast received by the television receiver 17, and if it is possible to receive the content of a 12-segment broadcast continuously to the content of the 1-segment broadcast, the CPU 11 switches to receiving the 12-segment broadcast and displays the broadcast content at the standard display magnification (second display magnification) of the 12-segment broadcast. On the other hand, if it is not possible to receive a 12-segment broadcast continuously to the 1-segment broadcast, the CPU 11 displays the content of the 1-segment broadcast by changing it to be displayed at the second display magnification.

As obvious from the above, only an instruction to change the display magnification given while the received broadcast content is being displayed enables viewing the broadcast content at the changed new display magnification with no interruption in viewing the content. Hence, the user can feel much less burdened.

With a digital broadcasting signal that contains both a 1-segment broadcast and a 12-segment broadcast, the display magnification of the broadcast content can be controlled only by switching of the broadcasting schemes, when an instruction to change the display magnification from the standard display magnification (first display magnification) of the 1-segment broadcast to the standard display magnification (second display magnification) of the 12-segment broadcast is given.

To change the display magnification is to enlarge or contract the displayed content on the display screen DP. An instruction to change the display magnification is entered when an operation for instructing the change of the display magnification is made. Thus, the displayed content can be changed to be enlarged or contracted.

Further, it is determined whether a 1-segment broadcast and a 12-segment broadcast can be continuously received or not, based on whether they are simultaneously broadcast, which is determined by comparing program information of a 1-segment broadcast and program information of a 12-segment broadcast. This enables smooth continuous viewing of the television broadcast.

Further, it is determined whether continuous reception is possible or not, based on the reception quality when the 12-segment broadcast is received on the channel on which the 1-segment broadcast is received. This enables smooth continuous viewing of the 12-segment broadcast as switched from the 1-segment broadcast.

In the above-described second embodiment, the first broadcasting scheme is the 1-segment broadcasting, and the second broadcasting scheme is the 12-segment broadcasting. Reversely, the first broadcasting scheme may be the 12-segment broadcasting, and the second broadcasting scheme may be the 1-segment broadcasting. In this case, the first display magnification may represent the standard display magnification for the 12-segment broadcasting, and the second display magnification may represent the standard display magnification for the 1-segment broadcasting.

Each of the embodiments described above has illustrated a cellular phone with a two-axial hinge having the operation casing 1 and the display casing 2 that are joined together free to fold open/closed and free to rotate via the hinge 3. The present invention may be applicable not only to this type of cellular phone, but also to other type of cellular phones such as a foldable type, a revolver type, a sliding type, etc.

Further, each of the embodiments described above has illustrated a case where a plurality of broadcasting schemes, namely 1-segment broadcasting and 12-segment broadcasting are available. The present invention can be applied not only to this case but also to a case where, for example, web television broadcasted through the Internet is available.

Additionally, each of the embodiments described above has illustrated a case where the broadcasting receiver according to the present invention is embodied in a cellular phone. However, the present invention can be applied not only to this, but also to portable terminals such as personal digital assistants (PDA), electronic cameras, electronic wristwatches, music players, etc. as long as they can be embodied as broadcasting receivers.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-292701 filed on Nov. 12, 2007 and including specification, claims, drawings and summary. The disclosure of the above Japanese Patent Application is incorporated herein by reference in its entirety.

What is claimed is:

1. A broadcasting receiver that can receive and display a broadcasting signal of a first broadcasting scheme and a second broadcasting scheme, comprising:

receiving unit that receives the broadcasted signal;

broadcasting scheme switching unit that switches broadcasting schemes of the broadcasting signal received by the receiving unit;

displaying unit that displays a broadcast content received by the receiving unit in a first display state in which the broadcast content is displayed in a first display size or at a first display magnification, or in a second display state in which the broadcast content is displayed in a second display size or at a second display magnification;

display state change instructing unit that instructs to change the display state in which the displaying unit is displaying;

determining unit that, when the display state change instructing unit instructs to change the display state while the displaying unit is displaying the broadcast content which the receiving unit receives in the first broadcasting scheme, determines whether it is possible or not to receive, continuously to the broadcast content in the first broadcasting scheme, the broadcast content in the second broadcasting scheme suitable for a new display state after the change;

first control unit that, when the determining unit determines that continuous reception from the first broadcasting scheme to the second broadcasting scheme is possible, controls the broadcasting scheme switching unit to switch from the first broadcasting scheme to the second broadcasting scheme and the displaying unit to display the broadcast content in the new display state after the change; and second control unit that, when the determining unit determines that continuous reception from the first broadcasting scheme to the second broadcasting scheme is not possible, controls the display state change instructing unit to instruct to change the display state, so that the broadcast content which the receiving unit receives in the first broadcasting scheme is displayed on the displaying unit in the new display state after the change.

2. The broadcasting receiver according to claim 1, wherein the determining unit determines, when the display state change instructing unit instructs to change the display size while the displaying unit is displaying, in the first display size, the broadcast content which the receiving unit receives in the first broadcasting scheme, whether it is possible or not to receive, continuously to the broadcast content in the first broadcasting scheme, the broadcast content in the second broadcasting scheme suitable for the second display size, the first control unit controls the broadcasting scheme switching unit to switch from the first broadcasting scheme to the second broadcasting scheme and the displaying unit to display the broadcast content in the second display size, when the determining unit determines that continuous reception from the first broadcasting scheme to the second broadcasting scheme is possible, and the second control unit controls the display state change instructing unit to instruct to change to the second display state so that the broadcast content received by the receiving unit in the first broadcasting scheme is displayed on the displaying unit in the second display size, when the determining unit determines that continuous reception from the first broadcasting scheme to the second broadcasting scheme is not possible.

3. The broadcasting receiver according to claim 1, wherein the determining unit determines, when the display state change instructing unit instructs to change the display magnification while the displaying unit is displaying, at the first display magnification, the broadcast content which the receiving unit receives in the first broadcasting scheme, whether it is possible or not to receive, continuously to the broadcast content in the first broadcasting scheme, the broadcast content in the second broadcasting scheme suitable for the second display magnification, the first control unit controls the broadcasting scheme switching unit to switch from the first broadcasting scheme to the second broadcasting scheme and the displaying unit to display the broadcast content at the second display magnification, when the determining unit determines that continuous reception from the first broadcasting scheme to the second broadcasting scheme is possible, and the second control unit controls the display state change instructing unit to instruct to change to the second display magnification so that the broadcast content which the receiving unit receives in the first broadcasting scheme is displayed on the displaying unit at the second display magnification, when the determining unit determines that continuous reception from the first broadcasting scheme to the second broadcasting scheme is not possible.

4. The broadcasting receiver according to claim 1, wherein the broadcasting signal is a digital broadcasting signal that contains both 1-segment broadcasting and 12-segment broadcasting, when the second display size is larger than the first display size, a broadcasting scheme suitable for the first display size is the 1-segment broadcasting and a broadcasting scheme suitable for the second display size is the 12-segment broadcasting, and when the second display magnification is greater than the first display magnification, a broadcasting scheme suitable for the first display magnification is the 1-segment broadcasting and a broadcasting scheme suitable for the second display magnification is the 12-segment broadcasting.

5. The broadcasting receiver according to claim 1, wherein the displaying unit includes a screen whose vertical length and horizontal length are different, to change the display size is to change a size of a display area in the screen, and the display state change instructing unit instructs to change the display size upon detecting at least one of:

a change of a posture of the screen;

a change of the posture of the screen in response to the situation that an apparatus body, which can be changed to a plurality of styles, is changed to a predetermined style;

a change of the posture of the screen in response to the situation that the apparatus body is set on a cradle device and a change of the posture of the screen in response to the situation that a posture of the apparatus body is changed.

6. The broadcasting receiver according to claim 1, wherein to change the display magnification is to enlarge or contract a displayed content on a screen, and the display state change instructing unit instructs to change the display magnification, when an operation to instruct to change the display magnification is made.

7. The broadcasting receiver according to claim 1, wherein when the display state change instructing unit instructs to change the display size, the broadcasting scheme switching unit identifies the broadcasting scheme currently being received earlier than the determining unit makes its determination, when identified that the current broadcasting scheme is the first broadcasting scheme, the determining unit is allowed to determine whether the continuous reception is possible or not, and when identified that the current broadcasting scheme is the second broadcasting scheme, the displaying unit is controlled to display the broadcast content in the second broadcasting scheme in the second display size.

8. The broadcasting receiver according to claim 1, wherein the determining unit determines whether a program broadcasted in the second broadcasting scheme is the same as a program broadcasted in the first broadcasting scheme, and based on a result of the determination, determines whether the continuous reception is possible or not.

9. The broadcasting receiver according to claim 1, wherein the determining unit determines whether the continuous reception is possible or not, based on a reception quality when a channel received in the first broadcasting scheme is received in the second broadcasting scheme.

10. A non-transitory computer-readable information recording medium that stores a program for controlling a computer to execute:

a function for receiving a broadcasting signal;

a function for switching broadcasting schemes of the received broadcasting signal;

a function for displaying a received broadcast content in a first display state in which the broadcast content is displayed in a first display size or at a first display magnification or in a second display state in which the broadcast content is displayed in a second display size or at a second display magnification;

a function for instructing a change of the display state;

a function for, when a change of the display state is instructed while the broadcast content received in the first broadcasting scheme is being displayed, determining whether it is possible or not to receive, continuously to the broadcast content in the first broadcasting scheme, the broadcast content in the second broadcasting scheme suitable for a new display state after the change;

a function for, when determined that continuous reception from the first broadcasting scheme to the second broadcasting scheme is possible, controlling the first broadcasting scheme to be switched to the second broadcasting scheme and the broadcast content to be displayed in the new display state after the change; and a function for, when determined that continuous reception from the first broadcasting scheme to the second broadcasting scheme is not possible, controlling a change of the display state to be instructed and the broadcast content received in the first broadcasting scheme to be displayed in the new display state after the change.

* * * * *